(12) United States Patent
Chapman

(10) Patent No.: US 8,839,489 B2
(45) Date of Patent: Sep. 23, 2014

(54) HEIGHT ADJUSTMENT DEVICE FOR A DOOR ON A TRANSIT VEHICLE

(71) Applicant: Wabtec Holding Corp., Wilmerding, PA (US)

(72) Inventor: Matthew Chapman, Wheeling, IL (US)

(73) Assignee: Wabtec Holding Corp., Wilmerding, PA (US)

( * ) Notice: Subject to any disclaimer, the term of this patent is extended or adjusted under 35 U.S.C. 154(b) by 0 days.

(21) Appl. No.: 14/004,331

(22) PCT Filed: Sep. 25, 2012

(86) PCT No.: PCT/US2012/057044
§ 371 (c)(1),
(2), (4) Date: Sep. 10, 2013

(87) PCT Pub. No.: WO2013/049017
PCT Pub. Date: Apr. 4, 2013

(65) Prior Publication Data
US 2014/0123790 A1    May 8, 2014

Related U.S. Application Data

(60) Provisional application No. 61/541,181, filed on Sep. 30, 2011.

(51) Int. Cl.
  *E05D 7/04*  (2006.01)
  *E05F 15/04* (2006.01)
  *F16H 25/20* (2006.01)
(52) U.S. Cl.
  CPC ............ *F16H 25/20* (2013.01); *E05F 15/045* (2013.01); *E05Y 2201/696* (2013.01); *E05Y 2600/314* (2013.01); *E05Y 2600/12* (2013.01); *E05Y 2900/51* (2013.01); *E05Y 2800/262* (2013.01); *E05Y 2201/706* (2013.01)
  USPC .......................................................... 16/244
(58) Field of Classification Search
  USPC .................. 16/244, 243, 248, 309, 386, 387; 312/326, 309, 405, 227, 295; 49/381, 49/388, 397; 296/146.11, 146.12, 202
  See application file for complete search history.

(56) References Cited

U.S. PATENT DOCUMENTS

| 586,146 A | 7/1897 | Steinfeldt |
| 1,341,690 A * | 6/1920 | Werner ........................... 16/244 |

(Continued)

FOREIGN PATENT DOCUMENTS

| DE | 3223625 A1 | 12/1983 |
| DE | 10001264 C1 | 10/2000 |

*Primary Examiner* — Chuck Mah
(74) *Attorney, Agent, or Firm* — The Webb Law Firm

(57) ABSTRACT

A height adjustment device for a transit shaft and arm assembly that enables height adjustments without significant disassembly of a transit door. An additional advantage is that the device does not require the use of shims, spacers or adjustment rings to adjust the height of the shaft and arm assemblies. Rotation of a nut threaded on the shaft allows for the adjustment of how much of the shaft hangs below a support member and a bearing. A surface of the nut bears on the bearing and the attached shaft and arm assembly hangs from the bearing and the support member the bearing is attached to. This arrangement allows the arm assembly to pivot along the longitudinal axis of the shaft. This arrangement also allows the height of the shaft and arm assembly to change with changes in position of the nut by threading the nut along the shaft.

5 Claims, 4 Drawing Sheets

(56) References Cited

U.S. PATENT DOCUMENTS

| | | | |
|---|---|---|---|
| 2,286,509 A * | 6/1942 | Roby | 16/248 |
| 2,302,484 A * | 11/1942 | Werner | 16/244 |
| 2,622,266 A | 12/1952 | Stehle | |
| 3,030,655 A | 4/1962 | Rudnick | |
| 3,407,433 A * | 10/1968 | Ferguson | 16/245 |
| 3,592,257 A * | 7/1971 | Matyas | 160/186 |
| 3,662,493 A * | 5/1972 | Foltz | 49/388 |
| 3,683,453 A * | 8/1972 | McLeland et al. | 16/248 |
| 4,189,805 A * | 2/1980 | Backus | 16/237 |
| 4,864,689 A * | 9/1989 | Brockhaus | 16/262 |
| 5,054,163 A * | 10/1991 | Sterling et al. | 16/244 |
| 7,017,974 B2 | 3/2006 | Tong et al. | |
| 2009/0038117 A1 * | 2/2009 | Moon | 16/240 |
| 2010/0024164 A1 * | 2/2010 | Machin et al. | 16/258 |
| 2010/0218342 A1 * | 9/2010 | Bertolini et al. | 16/244 |

* cited by examiner

HEIGHT ADJUSTMENT DEVICE FOR A DOOR ON A TRANSIT VEHICLE

BACKGROUND OF THE INVENTION

1. Field of the Invention

This invention relates to height adjustment devices for doors on transit vehicles such as buses and trains. More particularly the invention relates to a door height adjustment device for positioning and moving a shaft and arm assembly of a door of a transit vehicle. Some vehicle doors have a single panel mounted at an outside edge of the door opening. Many vehicle doors have two panels, each mounted at opposite outside edges of the door opening. The panels usually swing outward or inward or a combination thereof to permit entrance or exit of passengers.

2. Description of Related Art

It is sometimes desirable to adjust the height of the door of a transit vehicle for installation, repair, maintenance or upgrades. Current methods of adjusting the height of transit vehicle doors usually require substantial disassembly of the door assembly and related linkages, which requires the expenditure of significant time and effort. Other current methods require the addition or removal shims or adjustment rings to adjust the height of a transit vehicle door. This is also disadvantageous as it requires the appropriate hardware, shims or adjustment rings to be on hand when the door heights adjustments are made. This can add significant inventory costs for a fleet of transit vehicles, especially if adjustments need to be done in the field away from a centralized maintenance location.

An example of a type of transit vehicle door the present invention is aimed at improving is disclosed in U.S. Pat. No. 7,017,974. However other types and designs of transit vehicle doors can benefit from the improvements of the present invention.

SUMMARY OF THE INVENTION

A height adjustment device for a transit vehicle door shaft and arm assembly enables height adjustments without significant disassembly of a transit door. An additional advantage is that the device does not require the use of shims, spacers or adjustment rings to adjust the height of the shaft and arm assemblies. Rotation of a nut threaded on the door shaft allows for the adjustment of how much of the shaft hangs below a support member and a bearing. A surface of the nut bears on the bearing and the attached door shaft and arm assembly hangs from the bearing and the support member the bearing is attached to. This arrangement allows the arm assembly to pivot along the longitudinal axis of the shaft. This arrangement also allows the height of the door shaft and arm assembly to change with changes in position of the nut by threading the nut along the shaft.

In one embodiment, the present invention is a height adjustable transit vehicle door assembly comprising a support member attached to a bearing, a nut supported by the bearing, the nut being threaded onto an exteriorly threaded door shaft, the exteriorly threaded shaft being attached to a door arm assembly, wherein rotation of the nut raises or lowers the exteriorly threaded shaft which raises or lowers a door. In a further embodiment, said nut is positioned above the bearing and the support member. In yet a further embodiment, the support member, at least in part, supports the mass of the exteriorly threaded shaft, the door assembly and the door. In still yet another embodiment, the support member is attached to a frame of a vehicle. In still another embodiment, the support member is attached to a body of a vehicle.

In another embodiment, the present invention is a height adjustable transit vehicle door assembly comprising a nut threaded onto an exteriorly threaded door shaft, the nut having a surface that bears on a bearing, the bearing being supported by a support member, the support member being attached to a vehicle, the exteriorly threaded shaft being attached to a door arm assembly, wherein rotation of the nut relative to the exteriorly threaded shaft raises or lowers the exteriorly threaded shaft which raises or lowers a door. In a further embodiment, said nut is positioned above the bearing and the support member. In still a further embodiment, the support member, at least in part, supports the mass of the exteriorly threaded shaft, the door assembly and the door. In yet a further embodiment, the support member is attached to a frame of a vehicle. In yet still another embodiment, the support member is attached to a body of a vehicle. In still another embodiment, the surface of the nut bears on a race of the bearing.

BRIEF DESCRIPTION OF THE DRAWINGS

Further features and other objects and advantages will become apparent from the following detailed description made with reference to the drawings in which.

DETAILED DESCRIPTION OF THE INVENTION

Figure 1:
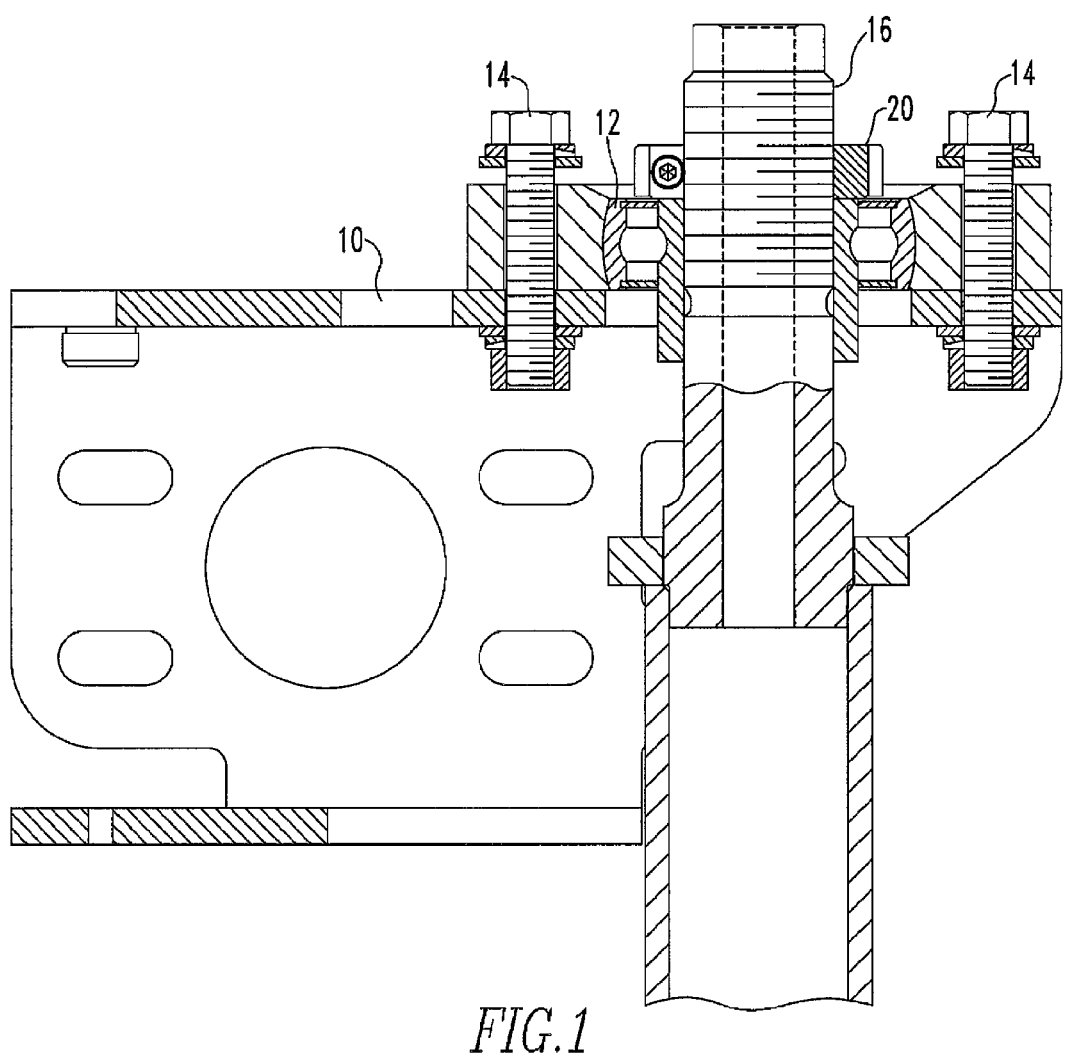
FIG. 1 is a cross-sectional view of the transit shaft and arm assembly height adjustment device according to this invention.
Figure 2:
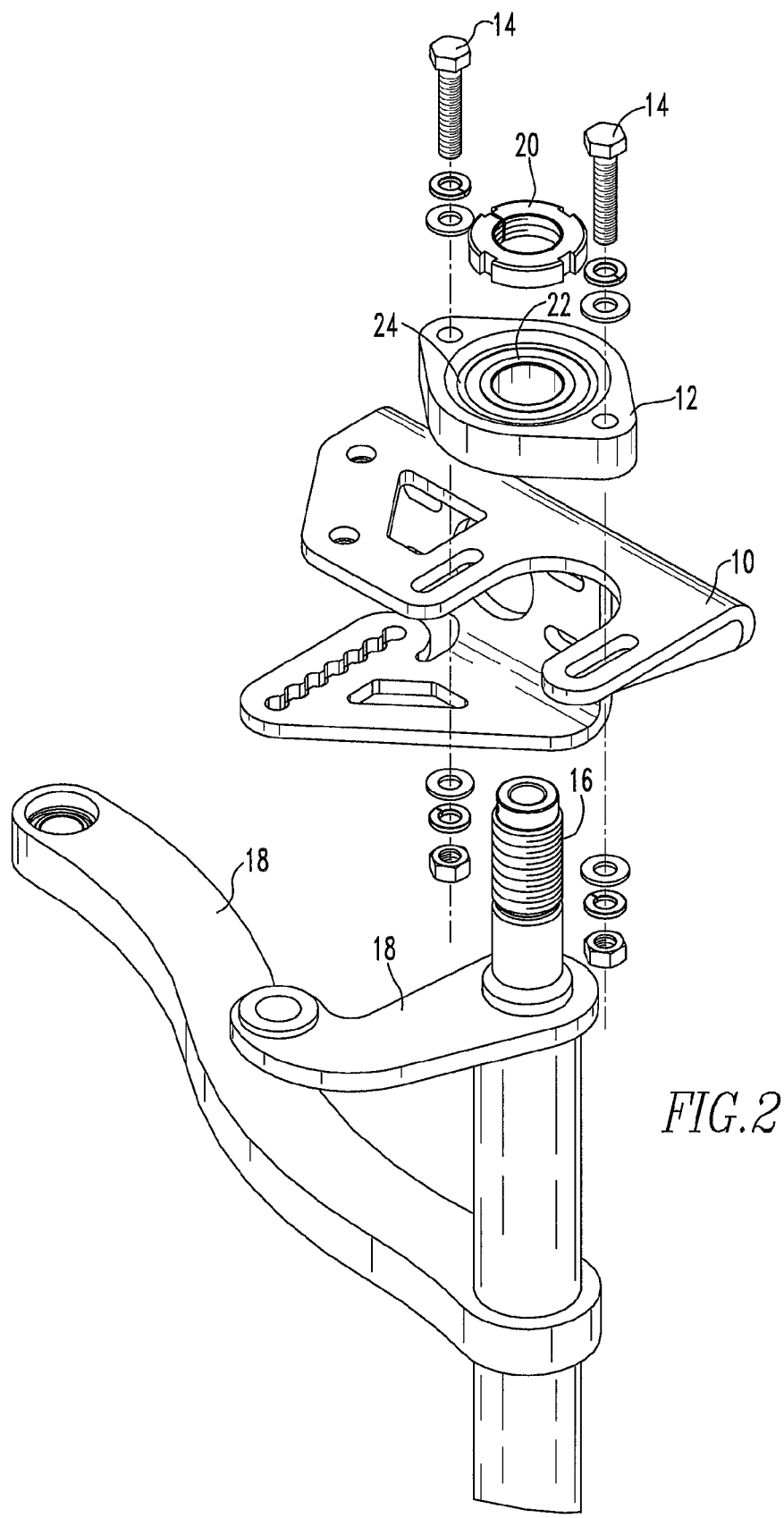
FIG. 2 is an exploded view of the transit shaft and arm assembly height adjustment device according to this invention.
Figure 3:
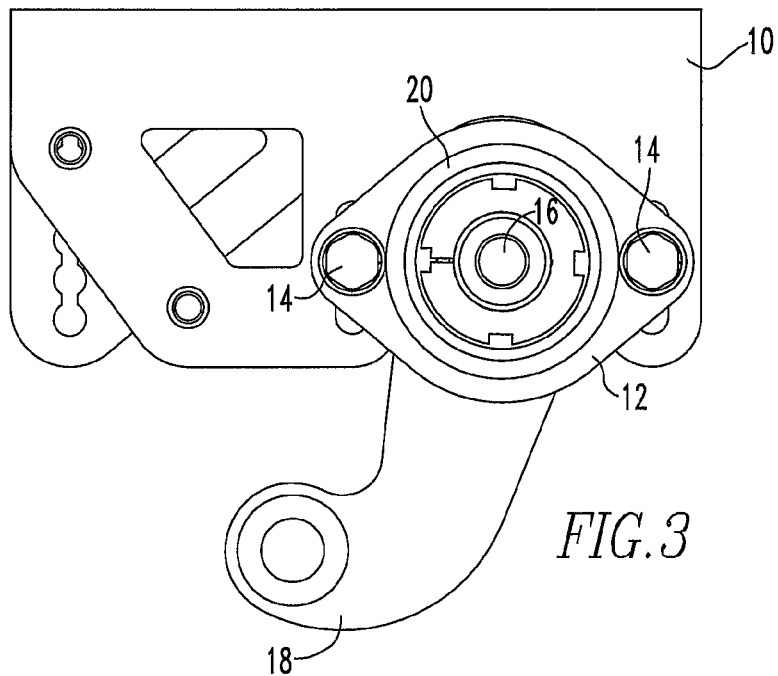
FIG. 3 is a top view of the assembled transit shaft and arm assembly height adjustment device according to this invention.
Figure 4:
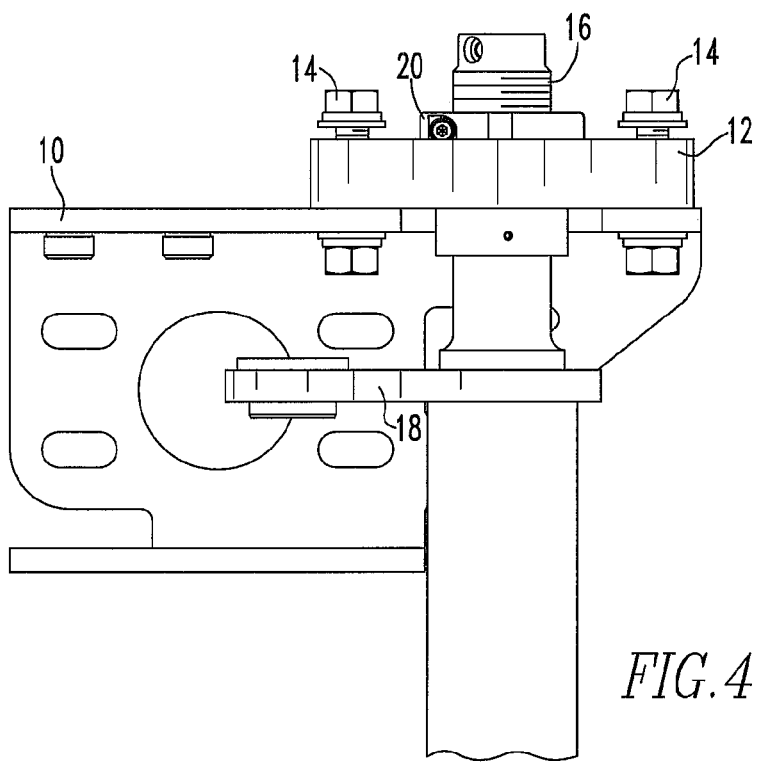
FIG. 4 is a side view of the assembled transit shaft and arm assembly height adjustment device according to this invention.
Figure 5:
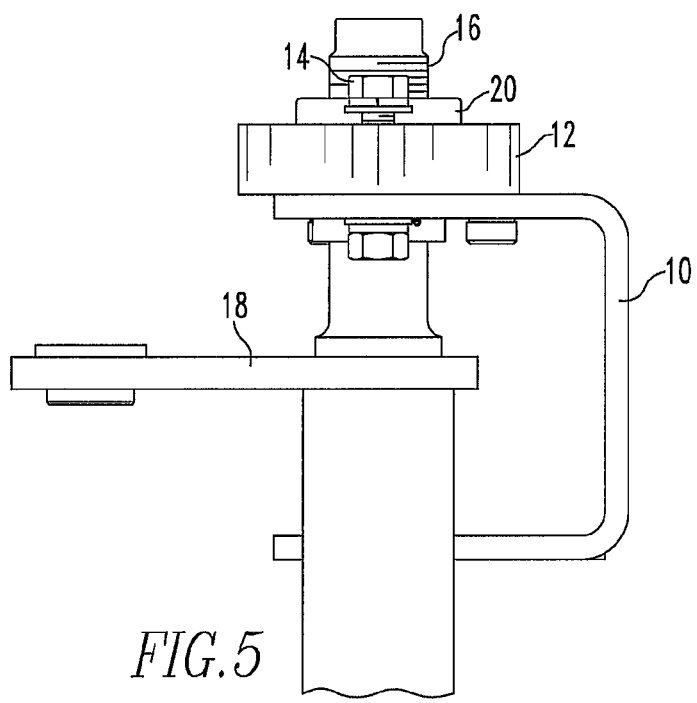
FIG. 5 is another side view of the assembled transit shaft and arm assembly height adjustment device according to this invention.
Figure 6:
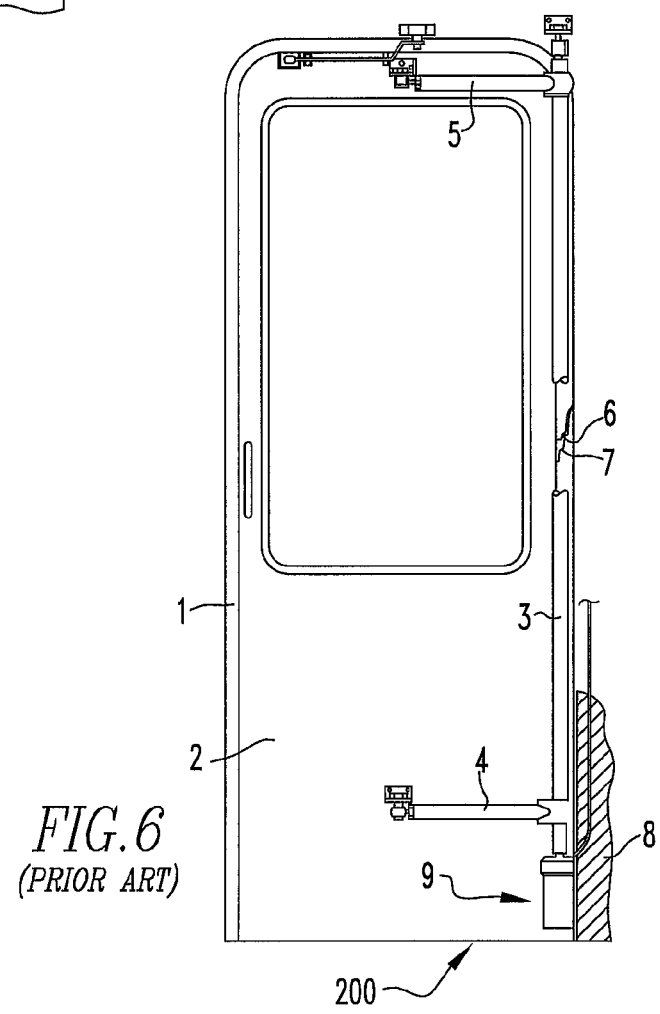
FIG. 6 is a plan view of a typical prior art door system.

FIG. 6 illustrates a typical prior art door system for which this invention has application. Such door system comprises a door 2 disposed in an aperture 1 of a transit vehicle. The door is supported by the first and second arms 4, 5 respectively which are in turn attached to a well known door post 3 (also called a door shaft). The door post or shaft is pivotally attached to the transit vehicle structure 8 near one end or both ends and may attached to a door operator 9 at one end. Other door operator arrangements are know. The door operator enable automatic operation of the door post or shaft and further enables opening and closing of the door. A stationary wedge element 6 attached to the transit vehicle and a movable wedge 7 attached to the door are provided to interlocking to prevent the door from unintentionally opening. This device for preventing unintentional opening of the door forms no part of this invention. Other such devices are possible.

FIGS. 1-5 show several views of a presently preferred embodiment of the present invention.

Referring now to FIGS. 1-5, a structure or support member 10 is attached to a vehicle frame or body (not shown). The support member 10 supports a bearing 12 which may be attached to the support member 10 by bolts 14 or another suitable fastener. An exteriorly threaded shaft 16 is attached to an arm assembly 18. The exteriorly threaded shaft 16 is positioned through the opening of the bearing 12 and has a nut 20 threaded onto the exteriorly threaded shaft 16. The nut 20 bears on bearing 12 to support exteriorly threaded shaft 16 attached to an arm assembly 18. The threaded shaft 16 and the arm assembly 18 hang from support member 10 by means of nut 20 bearing on bearing 12, which allows for the threaded shaft 16 and the arm assembly 18 to hingedly swing relative to the support member 10. The nut 20 bears on the bearing 12, but, more specifically, a surface of nut 20 may bear on an inner race 22, or an outer race 24, or a combination of theses two races of bearing 12. Preferably nut 20 bears on the inner race 22, but nut 20 could bear on any suitable surface of bearing 12.

Rotation of the nut 20 on the exteriorly threaded shaft 16 adjusts the height of the exteriorly threaded shaft 16 and arm assembly 18, which may support a transit. Note that the embodiment illustrated in FIG. 1 the uppermost end of the door shaft has a nut configuration enabling the use of wrenches for the relative adjustment of nut 2 and threaded door shaft 16. Thus appropriate stiffness can be provided between the internal and external threads such that normal operation of the door will not result in motion of the nut relative to the door shaft. Other methods of securing the nut and door shaft relative to each other are possible and contemplated according to this invention. The transit door could be supported by one or more exteriorly threaded shafts 16 and one or more arm assemblies 18.

LIST OF REFERENCE NUMERALS

1 aperture
2 door
3 door post shaft
4 first arm
5 second arm
6 wedge element
7 wedge element
8 transit vehicle structure
9 door operator
10 support member
12 bearing
14 bolt
16 exteriorly threaded shaft
18 arm assembly
20 nut
22 inner race
24 outer race

The invention claimed is:

1. An assembly for adjusting the height of a door on a transit vehicle comprising:
    a bearing,
    a support member (10) for positioning said bearing (12) adjacent a door opening,
    a door shaft (16) journaled in the bearing (12) and supporting a door arm assembly (18), said door shaft (16) having a lower portion hung below the bearing and an upper portion having exterior threads extending above the bearing (12),
    a nut (20) positioned above and supported axially by the bearing (12), said nut (20) being threaded onto the exterior threads of the door shaft (16),
    wherein rotation of the nut (20) relative to the door shaft (16) raises or lowers the door shaft (16) and said nut (20) is positioned above the bearing, and wherein the door shaft extends above the nut such that the nut and the door shaft are accessible to be grasped and rotated relative to each other.

2. The assembly for adjusting the height of a door on a transit vehicle of claim 1, wherein the support member, at least in part, supports the mass of the door shaft, and the door arm assembly.

3. The assembly for adjusting the height of a door on a transit vehicle of claim 1, wherein the support member is attached to a frame of a vehicle.

4. The assembly for adjusting the height of a door on a transit vehicle of claim 1, wherein the support member is attached to a body of a vehicle.

5. The assembly for adjusting the height of a door on a transit vehicle of claim 1, wherein the nut has at least one surface bearing on a race of the bearing.

* * * * *